United States Patent
Holder et al.

(10) Patent No.: US 6,298,661 B1
(45) Date of Patent: Oct. 9, 2001

(54) ENERGY EFFICIENT HYDRAULIC MOTOR CONTROL SYSTEM

(75) Inventors: Robert Edward Holder, Los Angeles; Da-Yu Hsu, Yorba Linda; Alfred Kotatsu Tengan, Huntington Beach, all of CA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/441,494

(22) Filed: Nov. 17, 1999

(51) Int. Cl.$^7$ .......................... F16D 31/02; B64C 12/40; B64C 13/48; G05D 1/00
(52) U.S. Cl. .................. 60/451; 244/226; 244/295
(58) Field of Search ................ 244/76 A, 226, 244/227, 195; 137/505; 417/218; 60/450

(56) References Cited

U.S. PATENT DOCUMENTS 5,307,630 * 5/1994 Tysver et al. ............... 60/451

* cited by examiner

Primary Examiner—Charles T. Jordan
Assistant Examiner—Christian M. Best
(74) Attorney, Agent, or Firm—L. J. Kasper

(57) ABSTRACT

An aircraft flap drive system utilized a variable displacement motor (15) having a fluid pressure actuated device (23) to vary the displacement of the motor. The system includes a displacement control valve (41), and an electrohydraulic control means (55,67,85) operable in response to an electrical input signal (91) to communicate pressurized fluid from a source (11) to the motor. The displacement control valve (41) includes a load sensing arrangement (13,53,49) responsive to an increasing load on the motor to bias the displacement control valve toward a position whereby the motor moves toward its maximum displacement (minimum flow). One result is that the conventional fixed displacement motor, of a particular size and weight, may be replaced by a variable motor which is smaller and lighter.

7 Claims, 3 Drawing Sheets

ENERGY EFFICIENT HYDRAULIC MOTOR CONTROL SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF THE DISCLOSURE

The present invention relates to a fluid pressure operated control system for controlling the position of a vehicle auxiliary device, and more particularly, to such a control system for controlling a device which is subject to varying loads throughout its range of displacements.

Although the fluid control system of the present invention may be used advantageously with many different types of vehicles and vehicle auxiliary devices, it is especially suited for use in controlling aircraft flaps and slats, and will be described in connection therewith.

Typically, aircraft flap and slat drive systems have been primarily hydraulic systems, and have utilized fixed displacement hydraulic motors as the means for directly actuating or driving the aircraft flaps.

Although the prior art systems, utilizing fixed displacement hydraulic motors, have been generally satisfactory in terms of performing the basic function of driving the flaps, the prior art system has had certain inherent drawbacks. It should be noted that these drawbacks are not peculiar to aircraft flap drive systems, but are also applicable to various other hydrostatic drive systems which operate to change the position of a device which is under varying load conditions, as it moves throughout its range of displacement.

A key operating criteria for an aircraft flap drive system is the ability to achieve full stroke (i.e., full movement of the flap) within a specified time period, and with the flap subjected to the specified load profile. In a flap drive system utilizing a fixed displacement hydraulic motor, the motor must be sized, in terms of its displacement per revolution, for full break-out torque at the peak load position (as that term will be explained subsequently). At all loads less than the peak load, with motor flow being constant, excess power (fluid pressure) is dissipated within the control system. Thus, in order for the control system to achieve the full stroke of the flap within the specified time, the required size of the hydraulic motor results in the system operating at an excessive flow rate, during most of its operating cycle.

The requirement to size the motor to satisfy the peak load situation, while still achieving full stroke in the specified time, requires a hydraulic motor which is larger, more expensive, and heavier than is desirable. As will be understood by those skilled in any of the vehicle arts, excess size and weight of component s is always undesirable, but such is especially true in the case of aircraft.

BRIEF SUMMARY OF THE INVENTION

Accordingly, it is an object of the present invention to provide an improved control system for driving a vehicle device such as an aircraft flap, wherein the size and weight of the hydraulic motor may be reduced.

It is a more specific object of the present invention to provide such a flow control system in which the operation of the hydraulic motor can be tailored to meet the operating parameters of the device being controlled by the system.

The above and other objects of the invention are accomplished by the provision of an improved aircraft flap drive system of the type including a source of pressurized fluid hydraulically coupled to a hydraulic motor, the motor including an output operable to drive the aircraft flap, and a brake device associated with the motor output and operable, when applied, to maintain the aircraft flap at a desired position.

The improved aircraft flap drive system is characterized by the hydraulic motor comprising a variable displacement motor including fluid pressure actuated means for varying displacement of the motor between a maximum displacement and a minimum displacement. A displacement control valve has an inlet and is operable to communicate pressurized fluid from the source through the inlet to the fluid pressure actuated means, the displacement control valve being normally biased toward a position permitting such communication. An electrohydraulic control means is operable in response to an electrical input signal to communicate pressurized fluid from the source to the hydraulic motor. The displacement control valve includes load sensing means operable in response to an increasing load on the hydraulic motor to bias the displacement control valve toward a position whereby the fluid pressure actuated means varies the displacement of the hydraulic motor toward the maximum displacement.

DETAILED DESCRIPTION OF THE PREFERRED EMBODIMENT

Figure 1:
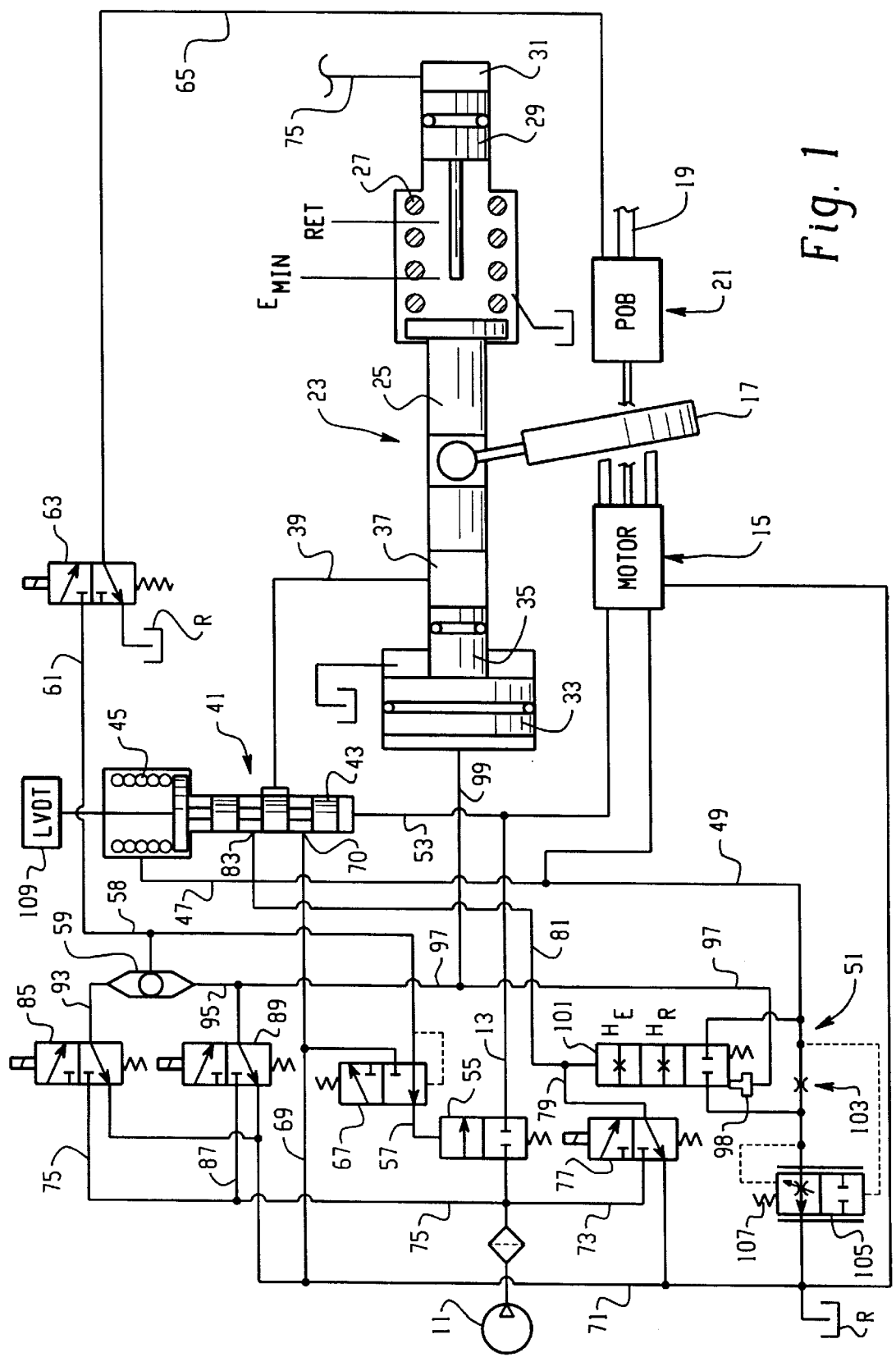
FIG. 1 is a hydraulic schematic of a hydraulic motor control system made in accordance with the present invention.

Referring now to the drawings, which are not intended to limit the invention, FIG. 1 illustrates a hydraulic schematic of a hydraulic motor control system made in accordance with the teachings of the present invention. The system includes a source of pressurized fluid, shown herein as a fixed displacement pump 11, the output of which is communicated by means of a conduit 13 to the inlet port of a variable displacement hydraulic motor 15. Although the invention is not so limited, the motor 15 is illustrated herein as being an axial piston motor of the type including a tiltable swashplate 17. Axial piston devices are well known to those skilled in the art. As is also well known, for a given, constant flow to the motor 15, movement of the swashplate 17 from the maximum displacement position shown in FIG. 1 toward a minimum displacement position will result in a gradually increasing speed of rotation of an output shaft 19, and at a gradually decreasing torque.

An aircraft flap (shown in FIG. 2) is an example of a vehicle device which must be moved to a desired position and then maintained at that particular, desired position. In order to accomplish such position maintenance, a brake assembly 21 is disposed about the output shaft 19. Although not an essential feature of the invention, it is preferred that the brake assembly 21 be of the "spring-applied, pressure-released" type, also referred to as the "pressure-off-brake" ("POB") type, for reasons which will become apparently subsequently.

Operably associated with the swashplate 17 is a swashplate actuator, generally designated 23, including a fluid pressure actuated piston 25 which is linked to the swashplate 17 by any suitable means, such that reciprocation of the piston 25 changes the tilt angle of the swashplate 17. The piston 25 is biased to the left in FIG. 1 by a spring 27, toward the maximum displacement position of the swashplate 17 shown in FIG. 1. Disposed adjacent the spring 27 is a stop piston 29 which is biased to the left in FIG. 1 by fluid pressure in a chamber 31, as will be described in greater detail subsequently. At the opposite end of the swashplate actuator 23 is another pressure actuated piston 33, including an actuator portion 35, the function of which will be described subsequently.

The piston 25 can be biased to the right in FIG. 1, from the position shown, by fluid pressure communicated to a chamber 37, by means of a conduit 39, from the outlet of a displacement control valve, generally designated 41. The displacement control valve 41 includes a valve spool 43 which is biased downward in FIG. 1 by a spring 45, and by fluid pressure communicated into the spring chamber from a conduit 47. The conduit 47 is teed into a conduit 49, by means of which fluid flowing out of the outlet port of the motor 15 is communicated to a flow limiter assembly, generally designated 51. The valve spool 43 is driven upward, in opposition to the force of the spring 45 and the pressure in the spring chamber, by fluid pressure in a conduit 53, which is teed into the conduit 13. Thus, the fluid pressures in the conduits 53 and 47 provide a "load sense" signal to the opposite ends of the valve spool 43, i.e., a fluid pressure differential representative of the load on the motor 15.

Disposed in the conduit 13 is a shut off valve 55 which is preferably a valve of the ON-OFF type, shown in FIG. 1 as being spring biased to the OFF (blocked flow) By position. The OFF position provides a hydraulic lock on the motor 15, when the motor is under load and the swashplate 17 is "positively" displaced from neutral (i.e., in the direction shown in FIG. 1) The shut off valve 55 is driven toward the ON (flow permitted) position by pressure in a conduit 57, which extends upstream, by means of a conduit 58, to the output of a shuttle valve 59. The output of the shuttle valve 59 is also connected to a conduit 61 which communicates with a brake control valve 63, the valve 63 preferably being a solenoid operated valve. Communication between the brake control valve 63 and the brake assembly 21 is by means of a conduit 65.

Disposed between the conduits 57 and 58 is a pilot operated pressure maintaining valve 67 which is driven by a pilot pressure from the conduit 58 to the position shown in FIG. 1, communicating conduit 58 to conduit 57. The pressure maintaining valve 67 is spring biased in the opposite direction, in the absence of a predetermine level of the pilot signal, toward a position in which the conduit 57 would be drained to a conduit 69. The conduit 69 is teed into a conduit 71, which is in open communication with a system reservoir R. The conduit 69 is also in communication with a return port 70 of the displacement control valve 41.

In communication with the conduit 13 is a pair of conduits 73 and 75. The conduit 73 communicates with a solenoid operated flow selector valve 77, shown in FIG. 1 as being spring biased to a position in which an adjacent conduit 79 is communicated to the conduit 71, and thus to the system reservoir R. The conduit 79 is teed into a conduit 81, which communicates with an inlet port 83 of the displacement control valve 41.

Figure 2:
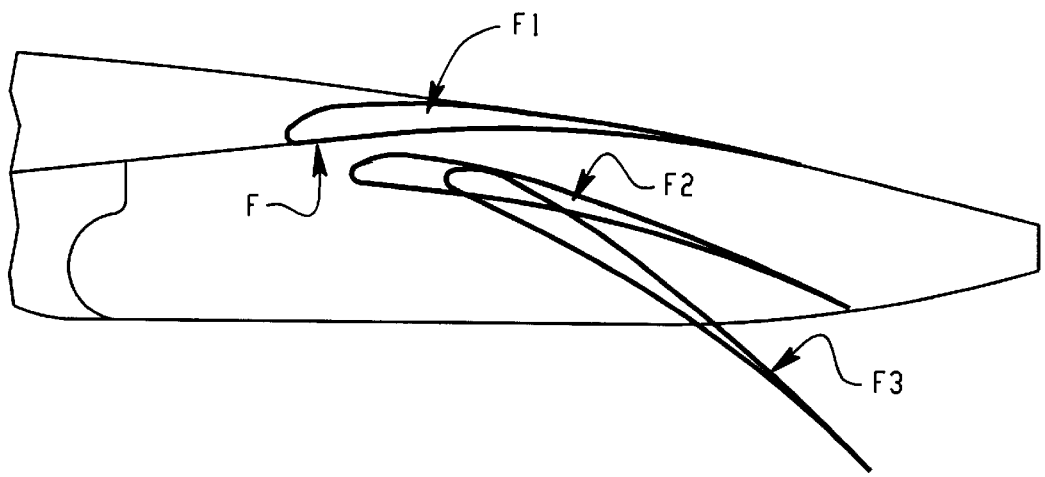
FIG. 2 is a simplified schematic of an aircraft flap of the type with which the motor control system of FIG. 1 may be utilized, illustrating three different operating positions of the flap relative to the wing profile.

The conduit 75 communicates with the inlet of a solenoid operated extend control valve 85, while the conduit 75 communicates by means of a conduit 87 to the inlet of a retract control valve 89. It should be understood by those skilled in the art that the use herein of the terms "extend" and "retract" are not meant to limit the invention, but instead, are by way of explanation, in reference to moving the aircraft flap in either one direction (to extend it) or in another position (to retract it). By way of further explanation, the position of the flap designated F1 in FIG. 2 is the fully retracted position, the position designated F2 is an intermediate, extended position, and the position designated F3 is the fully extended position.

The solenoid operated brake control valve 63, the flow selector valve 77, the extend control valve 85, and the retract control valve 89 are all operated by appropriate electrical signals, typically provided by the vehicle or aircraft microprocessor. For simplicity, actuation of any one or more of the valves will be described as occurring in response to an electrical input signal 91, the electrical leads representing the signal 91 being illustrated in conjunction with only the brake control valve 63 in FIG. 1.

Referring still primarily to FIG. 1, the output of the extend control valve 85 is connected to one inlet 93 of the shuttle valve 59, while the outlet of the retract control valve 89 is connected to another inlet 95 of the shuttle valve 59. Teed into the inlet 95 is a conduit 97, and teed into the conduit 97 is a conduit 99, communicating pressure to the left end of the pressure actuated piston 33, the operation of which will be described subsequently. The conduit 97 extends downward in FIG. 1 to the flow limiter assembly 51, and the pressure in the conduit 97 serves as a pilot pressure tending to drive a piston 98 in an upward direction, the piston 98 in turn driving a flow limiter sense valve 101. The valve 101 controls the amount of flow in the conduit 49 which bypasses a fixed orifice 103, and the pressure drop across the orifice 103 and the conducting orifice in the valve 101 is used to control the position of a flow limiting valve 105. As the pressure drop across the combined orifices in 101 and 103 increases, the flow limiting valve 105 is driven upwardly, in opposition to the biasing force of a spring 107, to further limit the outlet flow from the motor 15, through the conduit 49. Those skilled in the valve art will understand that the larger combined orifice flow area allows a higher flow through the valve 105. Increasing the restriction to flow through the conduit 49 increases the pressure in the conduit 47, thus tending to bias the displacement control valve 41 downward, toward a position permitting communication from the inlet 83 to the conduit 39, thus tending to move the pressure actuated piston 25 to the right in FIG. 1, corresponding to a reduced displacement of the swashplate 17.

With reference now to all of the drawings, the operation of the aircraft flap drive system of the present invention will be described. It will be assumed that an aircraft flap F is initially in the fully retracted position F1 (see FIG. 2). Before any motion of the flap F commences, all of the solenoid type control valves 63, 77, 85 and 89 are spring biased to the positions shown in FIG. 1, with the solenoids de-energized. In addition, the shutoff valve 55 is in the OFF or closed position shown in FIG. 1, and the flow limiter sense valve 101 is in the low flow position shown in FIG. 1.

Before movement of the flap commences, the flap is being held in the fully retracted position F1 by the brake assembly 21, which is applied, in the absence of system pressure in the conduit 65.

In order to extend the flap F away from the fully retracted position F1 toward an extended position (such as position F2 in FIG. 2), the solenoids of the flow selector valve 77 and the extend control valve 85 are energized, such that pressurized fluid is communicated from the pump 11 through the conduits 73 and 79 to the inlet 83 of the displacement control valve 41. At the same time, pressurized fluid is communicated through the conduit 75, and through the valve 85, to the inlet 93 of the shuttle valve 59, and from there through the conduit 61 to the inlet of the brake control valve 63 which briefly remains in the closed position as shown. With pressurized fluid being communicated through the shuttle valve 59 to the conduit 61, there is also pressure in the conduit 58 which pilots the pressure maintaining valve 67 to the position shown in FIG. 1, communicating pressure to the conduit 57. Pressure in the conduit 57 biases the shutoff valve 55 downward in FIG. 1, opening communication from the pump 11 to the conduit 13 and from there to the inlet of the motor 15.

At the same time, the fluid pressure in the conduit 79 biases the flow limiter sense valve 101 in a downward direction to the high flow, extend position $H_E$. The pressure in the conduit 13 biases the displacement control valve 41 upward, through conduit 53, in opposition to the force of the spring 45, draining the conduit 39 through the return port 70, and from there to the system reservoir R. With the chamber 37 of the swashplate actuator 23 thus being drained, the spring 27 biases the pressure actuator piston 25 to the left in FIG. 1, to the maximum displacement position of the swashplate 17. Next, the electrical input signal 91 is communicated to the brake control valve 63, opening the valve 63 and permitting communication from the conduit 61 to the conduit 65, thus releasing the brake and permitting the motor 15 to begin to rotate its output shaft 19, and to begin to move the flap from the fully retracted position F1 toward a position of at least some extension.

As the flow through the motor 15 and out through the conduit 49 reaches a predetermined flow limit, the pressure drop across the fixed orifice 103 and the high flow orifice $H_E$, begins to increase and, as was explained previously, the pressure drop across the combined orifices will bias the flow limiter valve 105 upward in FIG. 1, restricting flow through the conduit 49 and building up a back pressure in the conduit 47, thus biasing the displacement control valve 41 downward toward a position opening up communication between the inlet 83 and the conduit 39. For fairly light loads on the flap, the displacement of the swashplate 17 may already have been biased toward the minimum displacement position. As pressurized fluid is communicated into the conduit 39, and then into the chamber 37, the piston 25 is biased to the right in FIG. 1 in opposition to the force of the spring 27, moving the swashplate 17 toward a minimum ($E_{MIN}$) position. This minimum displacement position of the swashplate 17 is determined by the design and configuration of the stop piston 29 which is biased to the left in FIG. 1 to the position shown by pressure in the chamber 31, which would typically be the pump output pressure in the conduit 75, as shown in FIG. 1.

Figure 3:
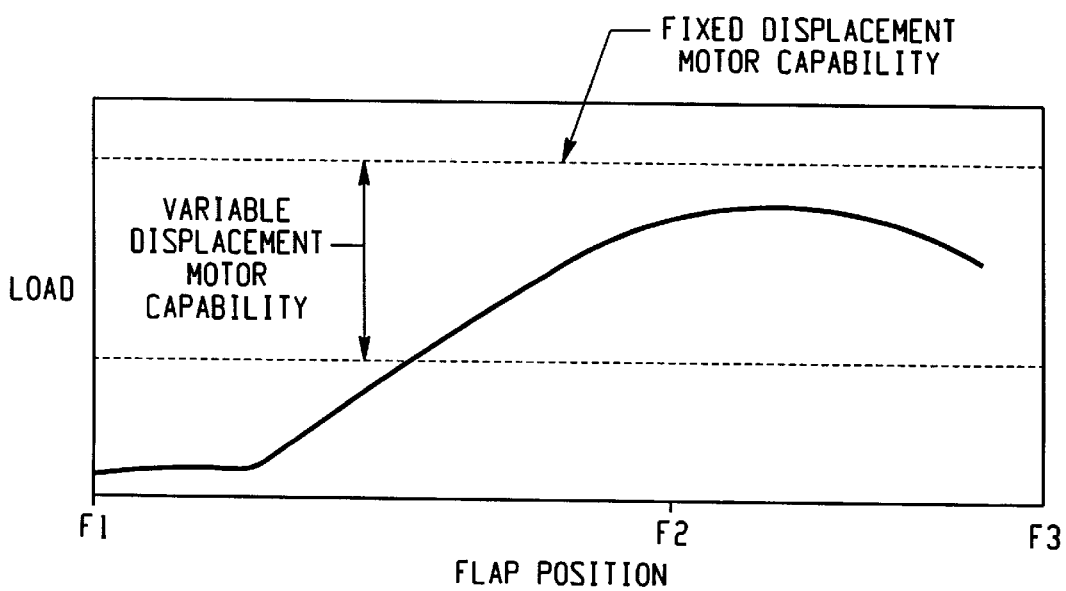
FIGS. 3, 4 and 5 are graphs of Load, Speed, and Flow Rate, respectively versus Flap Position, comparing the invention with the prior art control system.

As the flap moves from the fully retracted position F1 toward the fully extended position F3, as shown in FIG. 2, the load on the flap, and therefore the load on the motor 15 increases (see also the graph of FIG. 3). An increasing load on the motor 15 may be seen in an increasing pressure differential from the conduit 13 to the conduit 49, thus providing a "load sensing" type of control whereby the displacement of the motor will increase with increasing load and decrease with decreasing load. Those skilled in the flap actuator art will understand that the above statement is true only in regard to operation in the extend mode, in which the loads on the flap inherently oppose the actuation forces applied by the control system. On the other hand, in the retract mode, the loads on the flap are in the same direction as the retraction forces applied by the control system. Thus, in the retract mode, the swashplate actuator 23 merely has a fixed position (see "Ret." in FIG. 1).

At some predetermined angle before the flap reaches its desired position, the system will begin to operate in accordance with the following sequence. First, the solenoid of the flow selector valve 77 is de-energized, thus draining the conduit 79 to the system reservoir R, and permitting the flow limiter sense valve 101 to be biased upwardly to the low flow position shown in FIG. 1, blocking the high flow orifices, and reducing the flow through the valve 105. With the conduits 79 and 81 drained to tank, the conduit 39 is also drained to tank, thus insuring that the piston 25 moves to the left in FIG. 1 to the maximum displacement position of the swashplate 17. Thus, the motor 15 operates at its lowest speed as the desired stopping point is approached, and the solenoids of the extend control valve 85 and brake control valve 63 are both de-energized. The result is that the conduit 65 is drained to tank and the brake assembly 21 is applied, stopping the rotation of the output shaft 19. At the same time, the fluid pressure in the inlet 93 and in the conduit 61 is drained to tank. Thus, the flap comes to a stop, at some desired, extended position.

As noted previously, the load on the flap during the retract mode is normally much lower than the load on the flap during the extend mode. During the retract mode, the motor 15 may be set for relatively lower power and flow consumption. Therefor, in accordance with one aspect of the invention, retracting the flap is not merely the same process as extending the flap, except in reverse. Instead, the use of a pump 11 which is fixed displacement and a motor 15 which is variable displacement requires that retraction of the flap occur in response to the swashplate 17 of the motor being displaced "over-center", i.e., such that, as the motor 15 continues to receive pressurized fluid from the conduit 13, the direction of rotation of the output shaft 19 is reversed, and the flap is retracted. The retraction sequence will now be described.

First, the solenoids of the flow selector valve 77 and the retract control valve 89 are energized, thus communicating pressurized fluid through the conduits 73, 79 and 81 as described previously and through the conduit 75 as described previously but now also through the conduit 87 and the valve 89 to the inlet 95 of the shuttle valve 59. With pressurized fluid in the inlet 95, there is also pressure in the conduit 97 which is communicated to the lower end of the flow limiter sense valve 101, acting as a pilot signal as was described previously, biasing the piston 98 upward as a mechanical stop. The pressure in the conduit 79 biases the valve 101 downward to an intermediate high flow, retract position $H_R$. In this position $H_R$, the valve 101 provides some bypass around the fixed orifice 103, but less than in the extend position $H_E$.

Pressurized fluid at the inlet 95 results in pressure in the conduits 61 and 58 and, as was described previously, pressure in the conduit 58 biases the pressure maintaining valve 67 to the position shown in FIG. 1, thus providing pressure in the conduit 57 to move the shutoff valve 55 to the ON (open) position, such that pressure is communicated from the pump 11 through the conduit 13 to the inlet of the motor 15, in the manner described previously. Pressure at the inlet of the motor will again be communicated through the conduit 53 to bias the displacement control valve 41 in an upward direction in FIG. 1 to a position in which an LVDT 109 is actuated, to indicate pressure as being communicated to the motor.

The fluid pressure at the inlet 95 of the shuttle valve 59 and in the conduit 97 is communicated through the conduit 99 to act on the left end of the pressure actuated piston 33. By means of the actuator portion 35, the piston 33 moves to the right in FIG. 1, then engages the left end of the piston 25 and biases the piston 25 to the right in FIG. 1 until the piston 25 engages the left end of the stop piston 29. The fact that the piston 33 is substantially larger than the piston 29 enables the pressure acting on the piston 33 to "overpower" the stop piston 29, moving the piston 25 and the piston 29 until the piston 29 is bottomed out in the chamber 31. Thus, the swashplate 17 moves over-center to a predetermined swash angle, and remains in that swash angle, such that during the entire retract movement of the flap, the displacement of the motor 15 is effectively "fixed".

Next, the solenoid of the brake control valve 63 is energized, moving the valve 63 downward in FIG. 1 to pressurize the conduit 65 and release the brake assembly 21. With the brake released, the motor accelerates, and as flow out of the motor through the conduit 49 reaches the setting of the flow limiter assembly 51, the outlet flow is limited as described previously and the motor flow remains fairly constant during the high speed portion of the retraction of the flap.

While the flap is being retracted, as it approaches the desired position, the solenoid of the flow selector valve 77 is de-energized, thus draining the conduits 79 and 81 to tank and moving the flow limiter sense valve 101 upward to the low flow position shown in FIG. 1, as was described previously. The result will be a smaller pressure drop across the motor 15, and a smaller flow through the motor, thus reducing motor output speed.

Once the desired position of the flap has been achieved, the solenoids of the brake control valve 63 and retract control valve 89 are de-energized, thus draining the conduit 65 and permitting the brake assembly 21 to be engaged, stopping any further rotation of the output shaft 19. At the same time, the shutoff valve 55 again moves to its OFF (closed) position shown in FIG. 1, and the chamber 37 and conduit 39 are drained, as are the conduits 97 and 99 (through the valve 89). With all of these various conduits and chambers drained to tank, the swashplate actuator 23 again moves to the maximum displacement position shown in FIG. 1.

Figure 4:
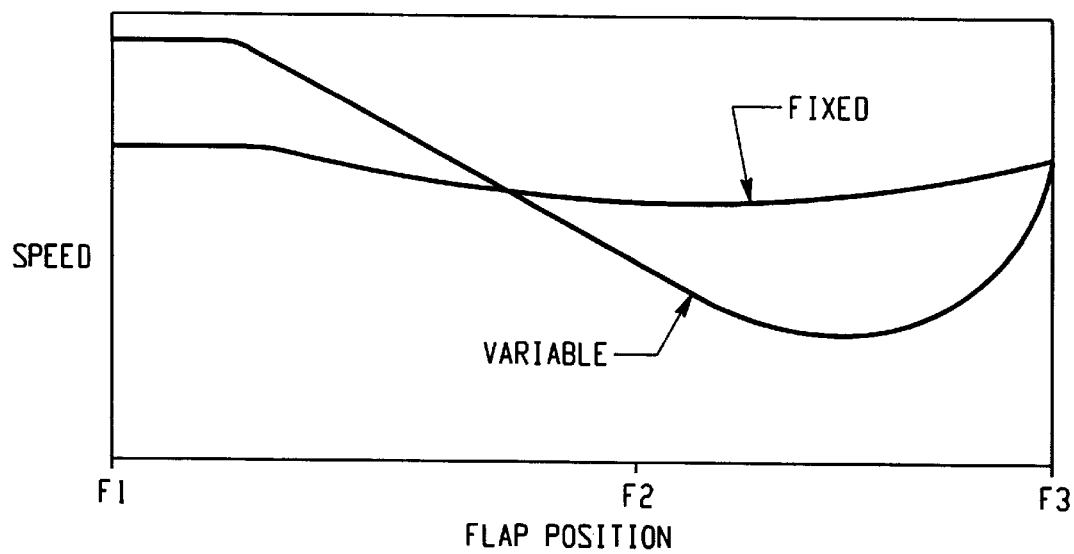
Figure 5:
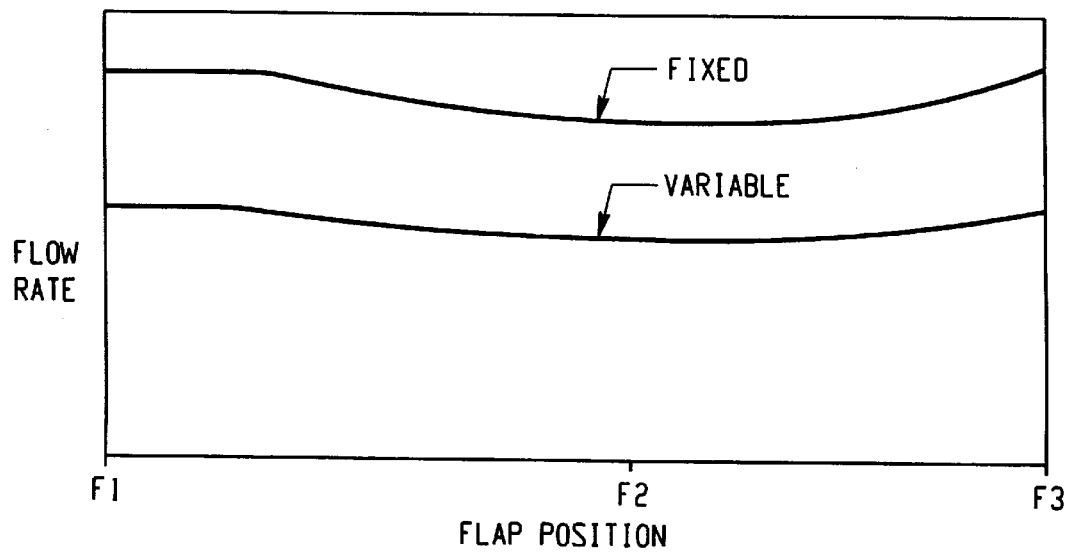

Referring now to the graphs of FIGS. 3 through 5, certain advantages of the present invention will become apparent. The solid line in the graph of FIG. 3 represents the load on the flap F as it moves from the fully retracted position F1 to the fully extended position F3. The drop-off in the flap load near the position F3 is merely the result of the inherent mechanical advantage in the linkage of the subject embodiment. The purpose of the FIG. 3 graph is to illustrate that, whereas the prior art fixed displacement motor must be sized to match the maximum load on the flap (i.e., the full break-out torque at peak load position), the variable displacement motor 15 of the invention can vary anywhere between the lower and upper load limits (dashed lines) to match the instantaneous load on the flap.

In FIG. 4, using the fixed motor of the prior art, the speed of the flap varies generally inversely proportional to the load on the flap. The same is true with regard to the variable motor of the invention, such that the total area under the two curves is identical, indicating equal "travel time" for the fixed and variable motors to move the flap from the position F1 to the position F3.

The advantage of the invention is seen in the graph of FIG. 5, showing Flow Rate through the motors, as a function of flap position. It may be seen in FIG. 5 that whereas the fixed motor must be sized for a relatively large flow, the variable motor of the invention may be sized substantially smaller, thus making it possible to meet the objects of the invention, as stated in the BACKGROUND OF THE DISCLOSURE. By way of example only, in developing the present invention it was found that, for a particular system, whereas a fixed motor capable of outputting 32 g.p.m. had been required, the system of the invention made it possible to utilize a variable displacement pump having a peak output flow rate of only 24 g.p.m. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. An aircraft flap drive system of the type including a source of pressurized fluid hydraulically coupled to a hydraulic motor, the motor including an output operable to drive the aircraft flap, and a brake device associated with said motor output and operable, when applied, to maintain said aircraft flap at a desired position; characterized by:

(a) said hydraulic motor comprising a variable displacement motor including fluid pressure actuated means for varying displacement of said motor between a maximum displacement and a minimum displacement ($E_{MIN}$);

(b) a displacement control valve having an inlet and being operable to communicate pressurized fluid from said source through said inlet to said fluid pressure actuated means, said displacement control valve being normally biased toward a position permitting said communication;

(c) electrohydraulic control means operable in response to an electrical input signal to communicate pressurized fluid from said source to said hydraulic motor; and (d) said displacement control valve including load sensing means operable in response to an increasing load on said hydraulic motor to bias said displacement control valve toward a position whereby said fluid pressure actuated means varies the displacement of said hydraulic motor toward said maximum displacement.

2. An aircraft flap drive system as claimed in claim 1, characterized by said electrohydraulic control means includes a brake control valve operable, in response to said electrical input signal to communicate a pressurized fluid to said brake device to move said brake device from said applied condition to a released condition.

3. An aircraft flap drive system as claimed in claim 1, characterized by said electrohydraulic control means includes an electrohydraulic flow valve operable, in response to said electrical input signal to communicate pressurized fluid from said source to said inlet of said displacement control valve, and operable, in the absence of said electrical input signal to communicate said inlet to a system reservoir.

4. An aircraft flap drive system as claimed in claim 1, characterized by said electrohydraulic control means includes an ON-OFF valve disposed in series flow relationship between said source and said hydraulic motor, said ON-OFF valve being normally biased to a position blocking flow therethrough, and being moveable, in response to said electrical input signal, to a position permitting flow therethrough.

5. An aircraft flap drive system as claimed in claim 1, characterized by said variable displacement motor comprising a motor operable over-center from a first direction of operation, operable to extend said aircraft flap, to a second direction of operation, operable to retract said aircraft flap.

6. An aircraft flap drive system as claimed in claim 5, characterized by said fluid pressure actuated means for varying displacement of said motor being operable over-center, and said electrohydraulic control means includes a retract control valve operable in response to said electrical input signal to communicate pressurized fluid from said source to a fluid pressure actuator operably associated with said fluid pressure actuated means for varying displacement of said motor from said first direction of operation to said second direction of operation.

7. An hydraulic drive system of the type including a source of pressurized fluid hydraulically coupled to a hydraulic motor, the motor including an output operable to drive a fluid pressure actuated implement of the type subjected to a varying load as the implement moves through its full range of motion, and a brake device associated with said motor output and operable, when applied, to maintain said implement at a desired position; characterized by:

(a) said hydraulic motor comprising a variable displacement motor including fluid pressure actuated means for varying displacement of said motor between a maximum displacement and a minimum displacement ($E_{MIN}$);

(b) a displacement control valve having an inlet and being operable to communicate pressurized fluid from said source through said inlet to said fluid pressure actuated means, said displacement control valve being normally biased toward a position permitting said communication;

(c) electrohydraulic control means operable in response to an electrical input signal to communicate pressurized fluid from said source to said hydraulic motor; and (d) said displacement control valve including load sensing means operable in response to an increasing load on said hydraulic motor to bias said displacement control valve toward a position whereby said fluid pressure actuated means varies the displacement of said hydraulic motor toward said maximum displacement.

* * * * *